(12) United States Patent
Zhang et al.

(10) Patent No.: US 11,107,237 B2
(45) Date of Patent: Aug. 31, 2021

(54) IMAGE FOREGROUND DETECTION APPARATUS AND METHOD AND ELECTRONIC DEVICE

(71) Applicant: Fujitsu Limited, Kawasaki (JP)

(72) Inventors: Nan Zhang, Beijing (CN); Qi Wang, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 87 days.

(21) Appl. No.: 16/448,611

(22) Filed: Jun. 21, 2019

(65) Prior Publication Data

US 2019/0311492 A1 Oct. 10, 2019

Related U.S. Application Data

(63) Continuation of application No. PCT/CN2017/072211, filed on Jan. 23, 2017.

(51) Int. Cl.
*G06T 7/73* (2017.01)
*G06T 7/194* (2017.01)
*G06T 7/00* (2017.01)
*G06T 7/20* (2017.01)

(52) U.S. Cl.
CPC .............. *G06T 7/73* (2017.01); *G06T 7/0002* (2013.01); *G06T 7/194* (2017.01); *G06T 7/20* (2013.01); *G06T 2207/20076* (2013.01)

(58) Field of Classification Search
CPC ......... G06T 7/73; G06T 7/194; G06T 7/0002; G06T 7/20
See application file for complete search history.

(56) References Cited

U.S. PATENT DOCUMENTS

| | | | | |
|---|---|---|---|---|
| 2004/0239762 A1* | 12/2004 | Porikli | .............. | G06T 7/20 |
| | | | | 348/169 |
| 2013/0084006 A1* | 4/2013 | Zhang | .............. | G06T 7/11 |
| | | | | 382/173 |
| 2013/0170557 A1* | 7/2013 | Wang | .............. | G06T 7/11 |
| | | | | 375/240.24 |
| 2015/0002672 A1 | 1/2015 | Hayakawa et al. | | |

(Continued)

FOREIGN PATENT DOCUMENTS

| | | | | |
|---|---|---|---|---|
| CN | 104392468 | * | 3/2015 | ............. G06T 7/254 |
| CN | 104392468 A | | 3/2015 | |

(Continued)

OTHER PUBLICATIONS

International Search Report and Written Opinion of the International Searching Authority dated Oct. 27, 2017 from International Patent Application No. PCT/CN2017/072211, 14 pages.

(Continued)

*Primary Examiner* — Qun Shen
(74) *Attorney, Agent, or Firm* — Staas & Halsey LLP (57) ABSTRACT

An image foreground detection apparatus and method and an electronic device. In the apparatus and method, in updating the background model, a pixel value of a sample value of which the pixel value difference is maximum is replaced with a predetermined probability, which may efficiently improve accuracy of the background model, and relatively large number of integral foreground image blocks which are accurate may be quickly obtained.

12 Claims, 5 Drawing Sheets

(56) References Cited

U.S. PATENT DOCUMENTS

| | | | | |
|---|---|---|---|---|
| 2016/0005182 A1* | 1/2016 | Ashani | ............ | G06T 7/44 |
| | | | | 382/173 |
| 2016/0125245 A1* | 5/2016 | Saitwal | ............ | G06T 7/136 |
| | | | | 382/173 |
| 2018/0033152 A1* | 2/2018 | Chen | ............ | G06T 7/155 |
| 2018/0197294 A1* | 7/2018 | Pan | ............ | G06T 7/11 |
| 2019/0102886 A1* | 4/2019 | Guigues | ............ | G06T 7/90 |

FOREIGN PATENT DOCUMENTS

| | | |
|---|---|---|
| CN | 104751484 A | 7/2015 |
| JP | 2-71380 | 3/1990 |
| JP | 5-225341 | 9/1993 |
| WO | 2013/129361 | 9/2013 |

OTHER PUBLICATIONS

Japanese Office Action dated Aug. 25, 2020 from Japanese Application No. 2019-534897, 8 pages.

\* cited by examiner

IMAGE FOREGROUND DETECTION APPARATUS AND METHOD AND ELECTRONIC DEVICE

CROSS-REFERENCE TO RELATED APPLICATIONS

This application is a continuation application of International Patent Application No. PCT/CN2017/072211, filed on Jan. 23, 2017, in the State Intellectual Property Office of China, the disclosure of which in incorporated herein by reference.

TECHNICAL FIELD

This disclosure relates to the field of information technologies, and in particular to an image foreground detection apparatus and method and an electronic device.

BACKGROUND

In the field of video surveillance, foreground detection is a basis for many applications. A great deal of research work has been done on methods of foreground detection. Most existing methods do background modeling at a pixel level to perform foreground detection, in which it is assumed that pixel values in an image sequence are distributed according to a certain rule. By means of statistic analysis on pixel values in historical image sequences, similar estimated background values are determined. After performing a full analysis on the whole image, a background model is obtained.

Foreground detection methods commonly used at present include a frame difference method, mixture of Gaussian, single Gaussian model, and codebook algorithm, etc.

When the frame difference method is used for detection, a pixel-based time difference is adopted between two adjacent frames of an image sequence, and a background and a foreground are distinguished by determining whether the difference is greater than a threshold. This algorithm is simple to implement and is insensitive to a change of illumination; however, it is unable to deal with complex scenarios.

When the single Gaussian model and the mixture of Gaussian are used for detection, a corresponding Gaussian distribution model is established for each pixel point in the image, and a background and a foreground are distinguished by determining whether a value obtained by the model is greater than a threshold. However, extraction accuracy of the single Gaussian mixture model is relatively low when there exists noise interference in the scenario, and the mixture of Gaussian is relatively large in calculation amount, and is sensitive to a change of illumination.

When the codebook algorithm is used for detection, a codebook structure is established for each pixel of a current image, and each codebook structure is composed of a plurality of codewords. Each codeword in a corresponding background model codebook is traversed for each pixel in the image, and a background and a foreground are distinguished according to whether a codeword exists such that a pixel satisfies a predetermined condition. However, this algorithm consumes a large amount of memory.

The above-mentioned existing detection methods are all based on the analysis of a single pixel, ignoring a relationship between pixels. The existing foreground detection methods further include a visual background extractor (VIBE) algorithm, in which a background model is initialized by using a single-frame image, and for a pixel point, it is assumed that adjacent pixels have spatial distribution characteristics of similar pixel values, and pixel values of its adjacent domain pixel points are randomly selected as background model sample values. Furthermore, samples needing to be replaced are randomly selected, and neighbor domain pixels are randomly selected to update the background model in this algorithm. This detection method is higher in detection accuracy and faster in detection speed than other existing detection methods described above.

It should be noted that the above description of the background is merely provided for clear and complete explanation of this disclosure and for easy understanding by those skilled in the art. And it should not be understood that the above technical solution is known to those skilled in the art as it is described in the background of this disclosure.

SUMMARY

However, the above-mentioned existing visual background extractor algorithm also has some disadvantages. For example, the efficiency of the algorithm in obtaining an integral foreground image block is low, and the number of obtained integral foreground image blocks is relatively small. And furthermore, when a real-time monitoring scenario becomes blurred, the visual background extractor algorithm is unable to obtain an integral foreground image block. In addition, since an initial image frame may include a moving object, a ghost image appears and is difficult to be removed quickly.

Embodiments of this disclosure provide an image foreground detection apparatus and method and an electronic device, in which in updating the background model, a pixel value of a sample value of which the pixel value difference is maximum is replaced with a predetermined probability, which may efficiently improve accuracy of the background model, and relatively large number of integral foreground image blocks which are accurate may be quickly obtained.

According to a first aspect of the embodiments of this disclosure, there is provided an image foreground detection apparatus, including: a first detecting unit configured to perform foreground detection on each pixel of an input image; wherein, the first detecting unit includes: a first calculating unit configured to calculate a first difference between a pixel value of the pixel and sample values in a background model corresponding to a position where the pixel is located; a first updating unit configured to, when the number of sample values in the background model of the first difference less than or equal to a first threshold is greater than or equal to a second threshold, replace a pixel value of a sample value in the background model of which the first difference is maximum with the pixel value of the pixel by a predetermined probability, to update the background model of the position where the pixel is located; and a first determining unit configured to, when the number of sample values in the background model of the first difference less than or equal to the first threshold is less than the second threshold, determine the pixel as a foreground pixel.

According to a second aspect of the embodiments of this disclosure, there is provided an electronic device, including the apparatus as described in the first aspect.

According to a third aspect of the embodiments of this disclosure, there is provided an image foreground detection method, including: performing foreground detection on each pixel of an input image; wherein, the performing foreground detection on each pixel comprises: calculating a first difference between a pixel value of the pixel and sample values in a background model corresponding to a position where the pixel is located; when the number of sample values in the background model of the first difference less than or equal to a first threshold is greater than or equal to a second threshold, replacing a pixel value of a sample value in the background model of which the first difference is maximum with the pixel value of the pixel by a predetermined probability, to update the background model of the position where the pixel is located; and when the number of sample values in the background model of the first difference less than or equal to the first threshold is less than the second threshold, determining the pixel as a foreground pixel.

An advantage of the embodiments of this disclosure exists in that in updating the background model, a pixel value of a sample value of which the pixel value difference is maximum is replaced with a predetermined probability, which may efficiently improve accuracy of the background model, and relatively large number of integral foreground image blocks which are accurate may be quickly obtained.

With reference to the following description and drawings, the particular embodiments of this disclosure are disclosed in detail, and the principle of this disclosure and the manners of use are indicated. It should be understood that the scope of the embodiments of this disclosure is not limited thereto. The embodiments of this disclosure contain many alternations, modifications and equivalents within the scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprises/comprising/includes/including" when used in this specification is taken to specify the presence of stated features, integers, steps or components but does not preclude the presence or addition of one or more other features, integers, steps, components or groups thereof.

These together with other aspects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

The drawings are included to provide further understanding of this disclosure, which constitute a part of the specification and illustrate the preferred embodiments of this disclosure, and are used for setting forth the principles of this disclosure together with the description. It is obvious that the accompanying drawings in the following description are some embodiments of this disclosure, and for those of ordinary skills in the art, other accompanying drawings may be obtained according to these accompanying drawings without making an inventive effort. In the drawings.

DETAILED DESCRIPTION

These and further aspects and features of the present disclosure will be apparent with reference to the following description and attached drawings. In the description and drawings, particular embodiments of the disclosure have been disclosed in detail as being indicative of some of the ways in which the principles of the disclosure may be employed, but it is understood that the disclosure is not limited correspondingly in scope. Rather, the disclosure includes all changes, modifications and equivalents coming within the terms of the appended claims.

Embodiment 1

Figure 1:
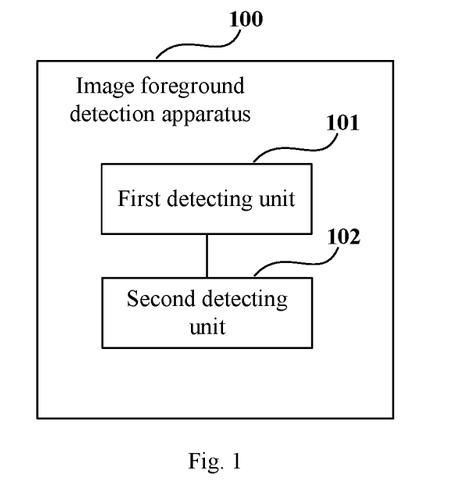
FIG. 1 is a schematic diagram of the image foreground detection apparatus of Embodiment 1 of this disclosure.

FIG. 1 is a schematic diagram of the image foreground detection apparatus of Embodiment 1 of this disclosure. As shown in FIG. 1, an image foreground detection apparatus 100 includes a first detector or first detecting unit 101 configured to perform foreground detection on each pixel of an input image.

Figure 2:
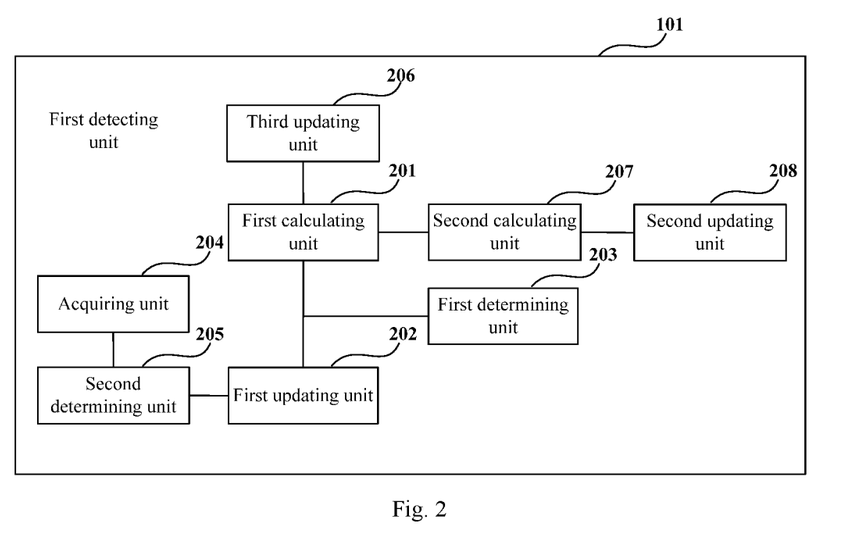
FIG. 2 is a schematic diagram of the first detecting unit of Embodiment 1 of this disclosure.

FIG. 2 is a schematic diagram of the first detecting unit 101 of Embodiment 1 of this disclosure. As shown in FIG. 2, the first detecting unit 101 includes a first calculating unit 201, a first updating unit 202 and a first determining unit 203.

The first calculator or first calculating unit 201 is configured to calculate a first difference between a pixel value of the pixel and sample values in a background model corresponding to a position where the pixel is located.

The first updating unit 202 is configured to, when the number of sample values in the background model of the first difference less than or equal to a first threshold is greater than or equal to a second threshold, replace a pixel value of a sample value in the background model of which the first difference is maximum with the pixel value of the pixel by a predetermined probability, to update the background model of the position where the pixel is located.

The first determining unit 203 is configured to, when the number of sample values in the background model of the first difference less than or equal to the first threshold is less than the second threshold, determine the pixel as a foreground pixel.

It can be seen from the above embodiment that in that in updating the background model, a pixel value of a sample value of which the pixel value difference is maximum, is replaced with a predetermined probability, which may efficiently improve accuracy of the background model, and a relatively large number of integral foreground image blocks which are accurate may be quickly obtained.

In this embodiment, the input image may be a monitoring image, which may be obtained according to an existing method. For example, it may be obtained by a camera installed over an area needing to be monitored.

In this embodiment, the input image may include a one-frame image, or may include a plurality of frames of images in a monitoring video. When the input image includes a plurality of frames of images, detection may be performed frame by frame.

In this embodiment, the first detecting unit 101 detects each pixel of the input image one by one.

In this embodiment, as shown in FIG. 2, the first detecting unit 101 may further include an acquiring unit 204 and a second determining unit 205.

The acquiring unit 204 is configured to obtain pixel values of a first number of surrounding pixels of the pixel.

The second determining unit 205 is configured to remove at least one surrounding pixel of which pixel value is maximum and at least one surrounding pixel of which pixel value is minimum to obtain pixel values of a second number of surrounding pixels, and determine the pixel values of the second number of surrounding pixels as being initial values of the sample values in the background model of the position where the pixel is located.

In this way, by removing the maximum and minimum pixel values in the pixel values of the surrounding pixels to initialize the background model, the accuracy of the background model may be further improved, and thus the accuracy of foreground detection may further be improved.

In this embodiment, the surrounding pixels of the pixel refer to pixels adjacent to the pixel and pixels adjacent to the pixel but at intervals, the first number may be determined according to an actual situation and a requirement on the number of sample values in the background model, and the second number is the number of sample values in the background model, which is set as actually demanded. For example, the first number is 24, and the second number is 20, i.e., the number of sample values in the background model is 20.

Figure 3:
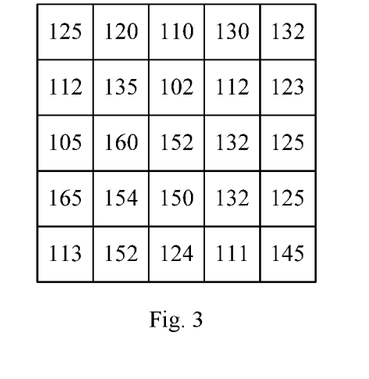
FIG. 3 is a schematic diagram of a pixel and its surrounding pixels of Embodiment 1 of this disclosure.

FIG. 3 is a schematic diagram of the pixel and its surrounding pixels of Embodiment 1 of this disclosure. As shown in FIG. 3, a pixel currently taken as a detection target is a central pixel with a pixel value of 152, which has 24 surrounding pixels. Two pixels having maximum pixel values, i.e., two surrounding pixels having pixel values of 165 and 160, and two pixels having minimum pixel values, i.e., two surrounding pixels having pixel values of 102 and 105, are removed, and pixel values of 20 surrounding pixels remained after the removal are taken as initial values of respective sample values in the background model where the current target pixel is located, that is, the initialized background model $L_{m,t}$={125, 120, 110, 130, 132, 112, 135, 112, 123, 132, 125, 154, 150, 132, 125, 113, 152, 124, 111, 145}, m denotes that the current target pixel is an m-th pixel, and t denotes that a time of the input image of the current frame is t.

In this embodiment, the first calculating unit 201 is used to calculate the difference between the pixel value of the pixel and the sample values in the background model corresponding to the position where the pixel is located, and the first updating unit is used to, when the number of the sample values in the background model of the first difference less than or equal to the first threshold is greater than or equal to the second threshold, replace the pixel value of the sample value in the background model of which the first difference is maximum with the pixel value of the pixel by a predetermined probability, to update the background model of the position where the pixel is located. In this embodiment, in order to distinguish from other difference values, the difference value is referred to as a first difference, and a second difference value and a third difference in this embodiment are also used to distinguish in terms of expression.

In this embodiment, the first detecting unit 101 may further include a determination unit (not shown in FIG. 2) configured to determine whether the number of the sample values in the background model of the first difference less than or equal to the first threshold is greater than or equal to the second threshold. For example, the determination unit may be provided in the first calculating unit 201.

In this embodiment, the second threshold value and the predetermined probability may be set according to an actual situation. For example, the second threshold value may be set according to a predetermined proportion of the number of all sample values in the background model. For example, the predetermined proportion is 0.1, that is, the second threshold value may be set to be 2 when the number of sample values in the background model is 20.

For example, the predetermined probability may be a value in a range of 0.05-0.2, such as 0.1.

In this embodiment, the first threshold may be updated at a predetermined period according to clarity of the input image, for example, the first detecting unit 101 may further include a third updating unit 206 configured to update the first threshold at a predetermined period according to clarity of the input image.

In such a way, in facing a change of an actual scenario, such as blurriness of the input image due to rain, heavy fog or cloudiness, the first threshold value may be adjusted according to the clarity of the image, which may efficiently deal with the change of the actual scenario, and an integral foreground image block may be obtained in various scenarios.

In this embodiment, the predetermined period may be set according to an actual situation, for example, the predetermined period is 30 minutes.

In this embodiment, for example, the third updating unit 206 may update the first threshold according to formula (1) below:

$$\text{radius} = \begin{cases} 5 & \text{clarity} < 10 \\ 3*\text{clarity} - 25 & 10 \le \text{clarity} < 35 \\ 35 & \text{clarity} \ge 35 \end{cases} \quad (1)$$

where, radius denotes the first threshold, and clarity denotes the clarity of the input image.

In this embodiment, for example, the clarity of the input image may be calculated according to formulae (2) and (3) below:

$$\text{sum} = \sum_{i=0}^{w} \sum_{j=0}^{h} \left( \sqrt{(I(i+1, j) - I(i, j))^2 + (I(i, j+1) - I(i, j))^2} + |I(i+1, j) - I(i, j)| + |I(i, j+1) - I(i, j)| \right); \quad (2)$$

$$\text{clarity} = \frac{\text{sum}}{\text{pixel\_num}} \quad (3)$$

where, clarity denotes the clarity of the input image, w denotes a width of the input image, h denotes a height of the input image, pixel_num denotes the number of pixel points in the input image, I denotes the pixel value, i and j denote the abscissa and ordinate of the pixel points.

A method for updating the first threshold of this embodiment is illustrated above.

In this embodiment, as shown in FIG. 2, the first detecting unit 101 may further include a second calculator or second calculating unit 207 and a second updating unit 208.

The second calculating unit 207 is configured to, when the number of sample values in the background model of the first difference less than or equal to the first threshold is greater than or equal to the second threshold, calculate a second difference between the pixel value of the pixel and pixel values of neighboring pixels of the pixel, to determine a neighboring pixel of which the second difference is maximum; and The second updating unit 208 is configured to calculate a third difference between the pixel value of the neighboring pixel of which the second difference is maximum and pixel values of sample values in the background model corresponding to a position where the neighboring pixel is located, and replace a pixel value of a sample value in the background model of which the third difference is maximum with the pixel value of the neighboring pixel of which the second difference is maximum by a predetermined probability, to update the background model of the position where the neighboring pixel is located.

In this embodiment, the adjacent pixels of the pixel refer to pixels in direct adjacency to the pixel. For example, for the pixels shown in FIG. 3, adjacent pixels of the pixel with a pixel value of 152 taken as the detection target are 8 pixels in direct adjacency to it, i.e. 8 pixels with pixel values of 135, 102, 112, 160, 132, 154, 150, and 132, respectively.

In this embodiment, the method by which the second updating unit 208 updates the background models where the adjacent pixels of the pixel are located is the same as the method in which the first updating unit 202 updates the background model where the pixel is located, which shall not be described herein any further.

In this way, the background model of the neighboring pixel having the maximum difference of the pixel is also updated, so that the accuracy of the background model may further be improved, and relatively large number of integral foreground image blocks which are accurate may be efficiently obtained.

In this embodiment, the first determining unit 203 is used to determine the pixel as a foreground pixel when the number of sample values of which the first difference is less than or equal to the first threshold in the background model is smaller than the second threshold. For example, the pixel value of the pixel is set to be 255.

In this embodiment, after the first detecting unit 101 performs foreground detection on each pixel of the input image, it may further perform ghost detection on the pixel determined as a foreground pixel.

For example, the input image includes continuous a plurality of frames of input images, and as shown in FIG. 1, the apparatus may further include a second detector or second detecting unit 102 configured to perform ghost detection on each of foreground pixels that are determined as being foreground pixels in the input images; and wherein, in performing ghost detection on each foreground pixel, when the number of times that pixels at a position where the foreground pixel is located are continuously detected as foreground pixels in the continuous a plurality of frames of input images is greater than a third threshold, or when the number of times that a difference between a pixel value of the pixel at a position where the foreground pixel is located in the continuous a plurality of frames of input images and a pixel value of a pixel at a corresponding position in a preceding frame of input image is less than a fourth threshold is greater than a fifth threshold, the foreground pixel is determined as being a ghost pixel, or else the foreground pixel is determined as being not a ghost pixel.

Figure 4:
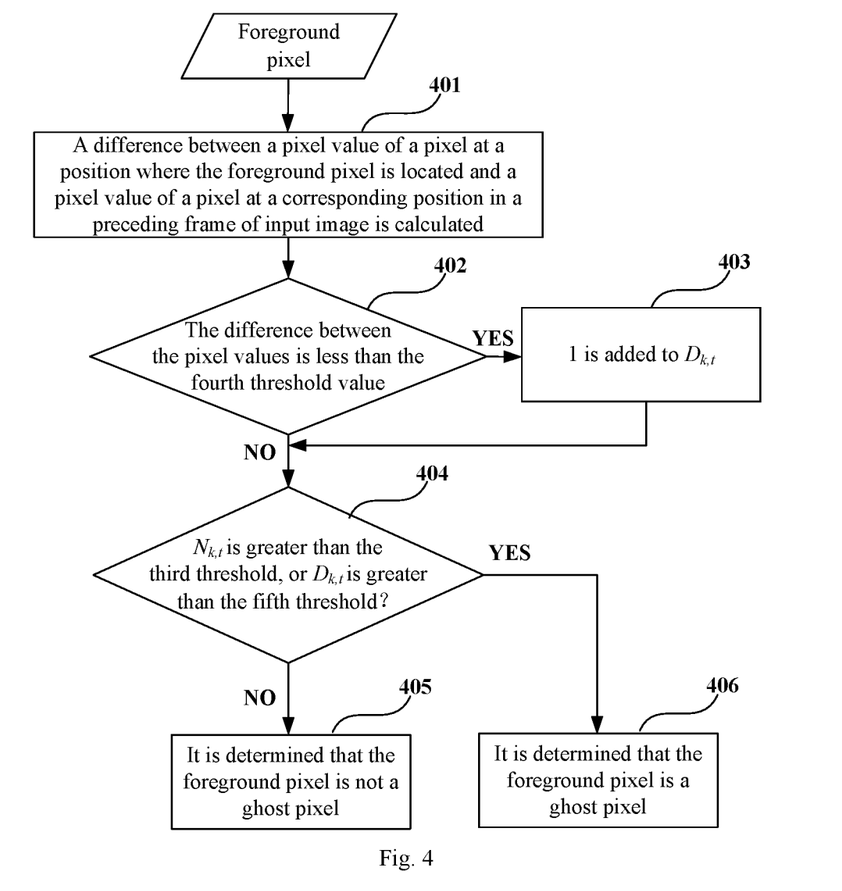
FIG. 4 is a flowchart of a method for performing ghost detection on a foreground pixel of Embodiment 1 of this disclosure.

FIG. 4 is a flowchart of a method for performing ghost detection on a foreground pixel of Embodiment 1 of this disclosure. As shown in FIG. 4, at 401: a difference between a pixel value of a pixel at a position where the foreground pixel is located and a pixel value of a pixel at a corresponding position in a preceding frame of input image is calculated.

At 402: it is determined whether the difference between the pixel values is less than the fourth threshold value, entering into 403 when a determination result is "yes", and entering into 404 when the determination result is "no".

At 403: 1 is added to an accumulated number of times $D_{k,t}$ that the difference between the pixel value of the pixel at the position where the foreground pixel is located and the pixel value of the pixel at the corresponding position in the preceding frame of input image is less than the fourth threshold value in the continuous a plurality of frames of input images; where, k denotes that the current foreground pixel is a k-th foreground pixel, and t denotes that a time of the input image of the current frame is t.

At 404: it is determined whether the number of times $N_{k,t}$ that the pixels at a position where the foreground pixel is located are continuously detected as foreground pixels in the continuous a plurality of frames of input images is greater than the third threshold, or whether the number of times $D_{k,t}$ that the difference between the pixel value of the pixel at the position where the foreground pixel is located in the continuous a plurality of frames of input images and the pixel value of the pixel at the corresponding position in the preceding frame of input image is less than the fourth threshold is greater than the fifth threshold, entering into 405 when a determination result is "no", and entering into 406 when the determination result is "yes"; where, k denotes that the current foreground pixel is a k-th foreground pixel, and t denotes that a time of the input image of the current frame is t.

At 405: it is determined that the foreground pixel is not a ghost pixel.

At 406: it is determined that the foreground pixel is a ghost pixel.

In this embodiment, the third threshold, the fourth threshold and the fifth threshold may be set according to an actual situation. For example, the third threshold may be 90, the fourth threshold may be 10, and the fifth threshold may be 70.

In this embodiment, when the foreground pixel is determined to be a ghost pixel, the background model at which the ghost pixel is located may be updated. For example, the background model at the position of the foreground pixel determined to be a ghost pixel is updated by the first updating unit 202 of the first detecting unit 101. The updating method used is identical to the method for updating the background model where the pixel is located by the first updating unit 202, which shall not be described herein any further.

In this way, by updating the background model of the ghost pixel, influence of ghost image may be quickly eliminated, and an accurate integral foreground image block may be obtained.

In this embodiment, the second updating unit 208 of the first detecting unit 101 may also update the background models where the neighboring pixels of the ghost pixel are located, with an updating method being identical to the foregoing description for the second updating unit 208, which shall not be described herein any further. By updating the background models of the neighboring pixels of the ghost pixel, the influence of the ghost image may further be eliminated.

As can be seen from the above embodiment that in updating the background model, a pixel value of a sample value of which the pixel value difference is maximum is replaced with a predetermined probability, which may efficiently improve accuracy of the background model, and relatively large number of integral foreground image blocks which are accurate may be quickly obtained.

In addition, by removing the maximum and minimum pixel values of the pixel values of the surrounding pixels to initialize the background model, the accuracy of the background model may further be improved, and the accuracy of foreground detection may further be improved.

Furthermore, in facing a change of an actual scenario, such as blurriness of the input image due to rain, heavy fog or cloudiness, the first threshold value may be adjusted according to the clarity of the image, which may efficiently deal with the change of the actual scenario, and an integral foreground image block may be obtained in various scenarios.

Moreover, by updating the background model of the neighboring pixels with the maximum difference between the pixels, the accuracy of the background model may further be improved, and relatively large number of integral foreground image blocks which are accurate may be quickly obtained.

In addition, by updating the background model of the ghost pixel, the influence of ghosts may be quickly eliminated, and an accurate integral foreground image block may be obtained.

Embodiment 2

Figure 5:
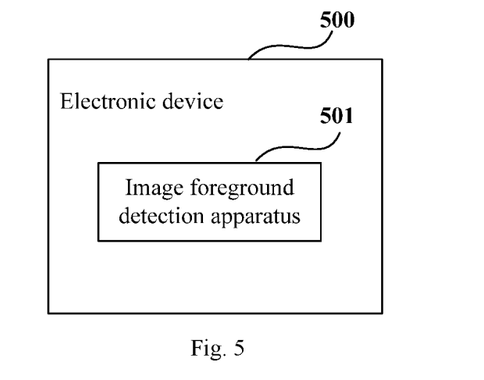
FIG. 5 is a schematic diagram of the electronic device of Embodiment 2 of this disclosure.

An embodiment of this disclosure provides an electronic device. FIG. 5 is a schematic diagram of the electronic device of Embodiment 2 of this disclosure. As shown in FIG. 5, an electronic device 500 includes an image foreground detector or detection apparatus 501, wherein a structure and functions of the image foreground detection apparatus 501 are identical to those described in Embodiment 1, which shall not be described herein any further.

Figure 6:
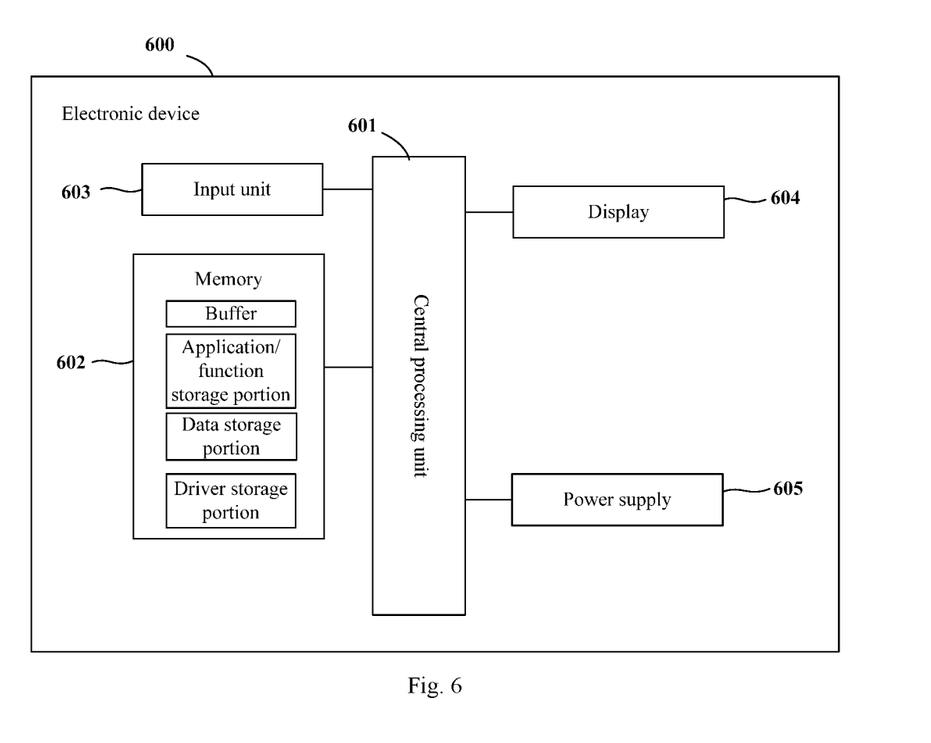
FIG. 6 is a block diagram of a systematic structure of the electronic device of Embodiment 2 of this disclosure.

FIG. 6 is a block diagram of a systematic structure of the network device of Embodiment 2 of this disclosure. As shown in FIG. 6, an electronic device 600 may include a central processing unit 601 and a memory 602, the memory 602 being coupled to the central processing unit 601. This figure is illustrative only, and other types of structures may also be used, so as to supplement or replace this structure and achieve a telecommunications function or other functions.

As shown in FIG. 6, the electronic device 600 may further include an input or input unit 603, a display 604, and a power supply 605.

In one implementation, the functions of the image foreground detection apparatus described in Embodiment 1 may be integrated into the central processing unit 601. The central processing unit 601 may be configured to perform foreground detection on each pixel of an input image, wherein, the performing foreground detection on each pixel includes calculating a first difference between a pixel value of the pixel and sample values in a background model corresponding to a position where the pixel is located. When the number of sample values in the background model of the first difference less than or equal to a first threshold is greater than or equal to a second threshold, replacing a pixel value of a sample value in the background model of which the first difference is maximum with the pixel value of the pixel by a predetermined probability, to update the background model of the position where the pixel is located. When the number of sample values in the background model of the first difference less than or equal to the first threshold is less than the second threshold, determining the pixel as a foreground pixel.

For example, the performing foreground detection on each pixel further includes: when the number of sample values in the background model of the first difference less than or equal to the first threshold is greater than or equal to the second threshold, calculating a second difference between the pixel value of the pixel and pixel values of neighboring pixels of the pixel, to determine a neighboring pixel of which the second difference is maximum; and calculating a third difference between the pixel value of the neighboring pixel of which the second difference is maximum and pixel values of sample values in the background model corresponding to a position where the neighboring pixel is located, and replacing a pixel value of a sample value in the background model of which the third difference is maximum with the pixel value of the neighboring pixel of which the second difference is maximum by a predetermined probability, to update the background model of the position where the neighboring pixel is located.

For example, the performing foreground detection on each pixel further includes: obtaining pixel values of a first number of surrounding pixels of the pixel; and removing at least one surrounding pixel of which pixel value is maximum and at least one surrounding pixel of which pixel value is minimum to obtain pixel values of a second number of surrounding pixels, and determining the pixel values of the second number of surrounding pixels as being initial values of the sample values in the background model of the position where the pixel is located.

For example, the performing foreground detection on each pixel further includes: updating the first threshold at a predetermined period according to clarity of the input image.

For example, the input image includes continuous a plurality of frames of input images, and the central processing unit 601 may further be configured to: perform ghost detection on each of foreground pixels that are determined as being foreground pixels in the input images; and wherein, the performing ghost detection on each of the foreground pixels includes: when the number of times that pixels at a position where the foreground pixel is located are continuously detected as foreground pixels in the continuous a plurality of frames of input images is greater than a third threshold, or when the number of times that a difference between a pixel value of the pixel at a position where the foreground pixel is located in the continuous a plurality of frames of input images and a pixel value of pixel at a corresponding position in a preceding frame of input image is less than a fourth threshold is greater than a fifth threshold, determining the foreground pixel as being a ghost pixel, or else determining the foreground pixel as being not a ghost pixel.

For example, and the central processing unit 601 may further be configured to: update a background model of a position where the foreground pixel that is determined as being a ghost pixel is located.

In another implementation, the image foreground detection apparatus described in Embodiment 1 and the central processing unit 601 may be configured separately. For example, the image foreground detection apparatus may be configured as a chip connected to the central processing unit 601, with its functions being realized under control of the central processing unit 601.

In this embodiment, the electronic device 600 does not necessarily include all the parts shown in FIG. 6.

As shown in FIG. 6, the central processing unit 601 is sometimes referred to as a controller or control, which may include a microprocessor or other processor devices and/or logic devices, and the central processing unit 601 receives input and controls operations of every component of the electronic device 600.

The memory 602 may be, for example, one or more of a buffer memory, a flash memory, a hard drive, a mobile medium, a volatile memory, a nonvolatile memory, or other suitable devices. And the central processing unit 601 may execute programs stored in the memory 602, so as to realize information storage or processing, etc. Functions of other parts are similar to those of the related art, which shall not be described herein any further. The parts of the electronic device 600 may be realized by specific hardware, firmware, software, or any combination thereof, without departing from the scope of the present disclosure.

It can be seen from the above embodiment that in that in updating the background model, a pixel value of a sample value of which the pixel value difference is maximum is replaced with a predetermined probability, which may efficiently improve accuracy of the background model, and relatively large number of integral foreground image blocks which are accurate may be quickly obtained.

Embodiment 3

Figure 7:
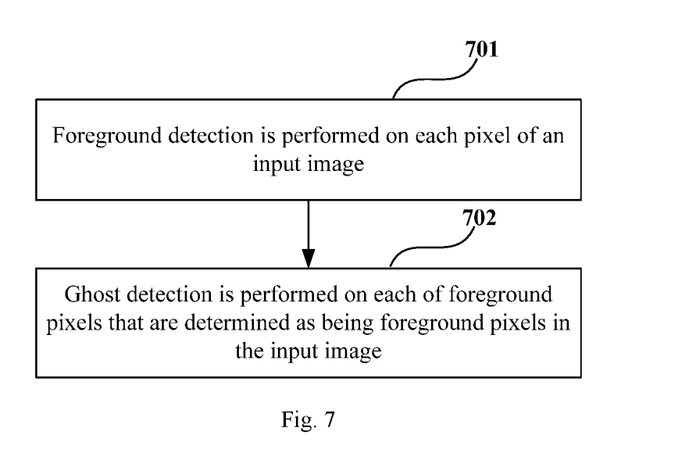
FIG. 7 is a flowchart of the image foreground detection method of Embodiment 3 of this disclosure.

An embodiment of this disclosure provides an image foreground detection method, corresponding to the image foreground detection apparatus described in Embodiment 1. FIG. 7 is a flowchart of the image foreground detection method of Embodiment 3 of this disclosure. As shown in FIG. 7, the method includes:

at 701: foreground detection is performed on each pixel of an input image.

At 702: ghost detection is performed on each of foreground pixels that are determined as being foreground pixels in the input image.

Figure 8:
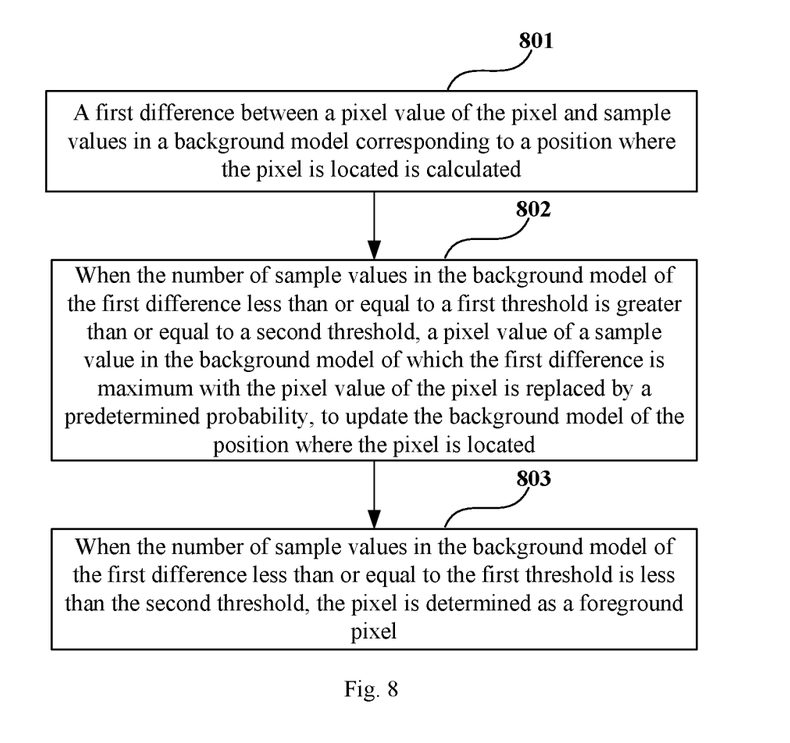
FIG. 8 is a flowchart of the method for performing foreground detection on each pixel of an input image at 701 in FIG. 7.

FIG. 8 is a flowchart of the method for performing foreground detection on each pixel of an input image in 701 in FIG. 7. As shown in FIG. 8, 701 includes:

At 801: a first difference between a pixel value of the pixel and sample values in a background model corresponding to a position where the pixel is located is calculated;

At 802: when the number of sample values in the background model of the first difference less than or equal to a first threshold is greater than or equal to a second threshold, a pixel value of a sample value in the background model of which the first difference is maximum with the pixel value of the pixel is replaced by a predetermined probability, to update the background model of the position where the pixel is located; and At 803: when the number of sample values in the background model of the first difference less than or equal to the first threshold is less than the second threshold, the pixel is determined as a foreground pixel.

Figure 9:
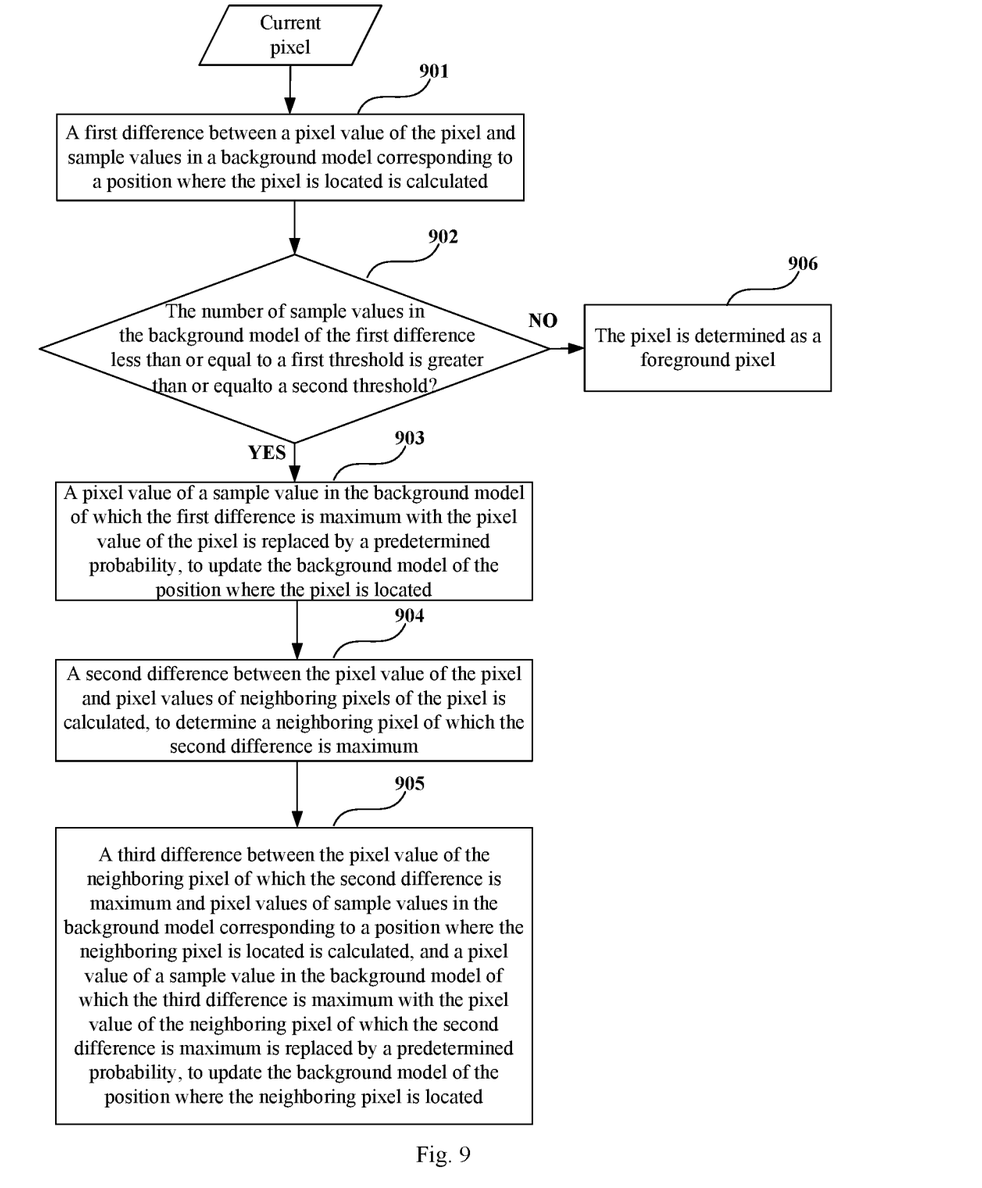
FIG. 9 is another flowchart of the method for performing foreground detection on each pixel of an input image at 701 in FIG. 7.

FIG. 9 is another flowchart of the method for performing foreground detection on each pixel of an input image in 701 in FIG. 7. As shown in FIG. 9, 701 includes:

at 901: a first difference between a pixel value of the pixel and sample values in a background model corresponding to a position where the pixel is located is calculated;

at 902: it is determined whether the number of sample values in the background model of the first difference less than or equal to a first threshold is greater than or equal to a second threshold, entering into 903 when a determination result is "yes", and entering into 906 when the determination result is "no";

at 903: a pixel value of a sample value in the background model of which the first difference is maximum with the pixel value of the pixel is replaced by a predetermined probability, to update the background model of the position where the pixel is located;

at 904: a second difference between the pixel value of the pixel and pixel values of neighboring pixels of the pixel is calculated, to determine a neighboring pixel of which the second difference is maximum;

at 905: a third difference between the pixel value of the neighboring pixel of which the second difference is maximum and pixel values of sample values in the background model corresponding to a position where the neighboring pixel is located is calculated, and a pixel value of a sample value in the background model of which the third difference is maximum with the pixel value of the neighboring pixel of which the second difference is maximum is replaced by a predetermined probability, to update the background model of the position where the neighboring pixel is located; and at 906: the pixel is determined as a foreground pixel.

In this embodiment, particular methods used in the above steps are identical to those described in Embodiment 1, which shall not be described herein any further.

It can be seen from the above embodiment that in that in updating the background model, a pixel value of a sample value of which the pixel value difference is maximum is replaced with a predetermined probability, which may efficiently improve accuracy of the background model, and relatively large number of integral foreground image blocks which are accurate may be quickly obtained.

An embodiment of the present disclosure provides a computer readable program, which, when executed in an image foreground detection apparatus or an electronic device, may cause a computer to carry out the image foreground detection method as described in Embodiment 3 in the image foreground detection apparatus or the electronic device.

An embodiment of the present disclosure provides a computer storage medium, including a computer readable program, which may cause a computer to carry out the image foreground detection method as described in Embodiment 3 in an image foreground detection apparatus or an electronic device.

The image foreground detection method carried out in the image foreground detection apparatus described with reference to the embodiments of this disclosure may be directly embodied as hardware, software modules executed by a processor, or a combination thereof. For example, one or more functional block diagrams and/or one or more combinations of the functional block diagrams shown in FIGS. 1 and 2 may either correspond to software modules of procedures of a computer program, or correspond to hardware modules. Such software modules may respectively correspond to the operations shown in FIGS. 7, 8 and 9. And the hardware module, for example, may be carried out by firming the soft modules by using a field programmable gate array (FPGA).

The soft modules may be located in an RAM, a flash memory, an ROM, an EPROM, and an EEPROM, a register, a hard disc, a floppy disc, a CD-ROM, or any memory medium in other forms known in the art. A memory medium may be coupled to a processor, so that the processor may be able to read information from the memory medium, and write information into the memory medium; or the memory medium may be a component of the processor. The processor and the memory medium may be located in an ASIC. The soft modules may be stored in a memory of a mobile terminal, and may also be stored in a memory card of a pluggable mobile terminal. For example, if equipment (such as a mobile terminal) employs an MEGA-SIM card of a relatively large capacity or a flash memory device of a large capacity, the soft modules may be stored in the MEGA-SIM card or the flash memory device of a large capacity.

One or more functional blocks and/or one or more combinations of the functional blocks in FIGS. 1 and 2 may be realized as a universal processor, a digital signal processor (DSP), an application-specific integrated circuit (ASIC), a field programmable gate array (FPGA) or other programmable logic devices, discrete gate or transistor logic devices, discrete hardware component or any appropriate combinations thereof carrying out the functions described in this application. And the one or more functional block diagrams and/or one or more combinations of the functional block diagrams in FIGS. 1 and 2 may also be realized as a combination of computing equipment, such as a combination of a DSP and a microprocessor, multiple processors, one or more microprocessors in communication combination with a DSP, or any other such configuration.

This disclosure is described above with reference to particular embodiments. However, it should be understood by those skilled in the art that such a description is illustrative only, and not intended to limit the protection scope of the present disclosure. Various variants and modifications may be made by those skilled in the art according to the principle of the present disclosure, and such variants and modifications fall within the scope of the present disclosure.

The invention claimed is:

1. An image foreground detection apparatus, comprising:
 a first detector configured to perform foreground detection on each pixel of an input image, the first detector including a first calculator configured to calculate a first difference between a pixel value of the pixel and sample values in a background model corresponding to a position where the pixel is located;
 a memory that stores instructions; and
 a processor coupled to the memory and configured to execute the instructions to:
  replace, when the number of sample values in the background model of the first difference less than or equal to a first threshold is greater than or equal to a second threshold, a pixel value of a sample value in the background model of which the first difference is maximum with the pixel value of the pixel by a predetermined probability, to update the background model of the position where the pixel is located,
  determine, when the number of sample values in the background model of the first difference less than or equal to the first threshold is less than the second threshold, the pixel as a foreground pixel, and
  update the first threshold at a predetermined period according to formula (1), where radius denotes the first threshold, and clarity denotes the clarity of the input image:

$$radius = \begin{cases} 5 & clarity < 10 \\ 3*clarity - 25 & 10 \le clarity < 35 \\ 35 & clarity \ge 35 \end{cases} \quad (1)$$

2. The apparatus according to claim 1,
 wherein the first detector further comprises: a second calculator configured to, when the number of sample values in the background model of the first difference less than or equal to the first threshold is greater than or equal to the second threshold, calculate a second difference between the pixel value of the pixel and pixel values of neighboring pixels of the pixel, to determine a neighboring pixel of which the second difference is maximum; and
 wherein the processor is further configured to calculate a third difference between the pixel value of the neighboring pixel of which the second difference is maximum and pixel values of sample values in the background model corresponding to a position where the neighboring pixel is located, and replace a pixel value of a sample value in the background model of which the third difference is maximum with the pixel value of the neighboring pixel of which the second difference is maximum by a predetermined probability, to update the background model of the position where the neighboring pixel is located.

3. The apparatus according to claim 1, wherein the processor is further configured to
 obtain pixel values of a first number of surrounding pixels of the pixel; and
 remove at least one surrounding pixel of which pixel value is maximum and at least one surrounding pixel of which pixel value is minimum to obtain pixel values of a second number of surrounding pixels, and determine the pixel values of the second number of surrounding pixels as being initial values of the sample values in the background model of the position where the pixel is located.

4. The apparatus according to claim 1, wherein the input image comprises continuous a plurality of frames of input images, and the apparatus further comprises:
 a second detector configured to perform ghost detection on each of foreground pixels that are determined as being foreground pixels in the input images; and
 wherein, in performing ghost detection on each foreground pixel, when the number of times that pixels at a position where the foreground pixel is located are continuously detected as foreground pixels in the continuous a plurality of frames of input images is greater than a third threshold, or when the number of times that a difference between a pixel value of the pixel at a position where the foreground pixel is located in the continuous a plurality of frames of input images and a pixel value of a pixel at a corresponding position in a preceding frame of input image is less than a fourth threshold is greater than a fifth threshold, the foreground pixel is determined as being a ghost pixel, or else the foreground pixel is determined as being not a ghost pixel.

5. The apparatus according to claim 4, wherein the processor is further configured to update a background model of a position where the foreground pixel that is determined as being a ghost pixel is located.

6. An electronic device, comprising the apparatus as claimed in claim 1.

7. An image foreground detection method performed on each pixel of an input image, comprising:
 calculating a first difference between a pixel value of the pixel and sample values in a background model corresponding to a position where the pixel is located;

when the number of sample values in the background model of the first difference less than or equal to a first threshold is greater than or equal to a second threshold, replacing a pixel value of a sample value in the background model of which the first difference is maximum with the pixel value of the pixel by a predetermined probability, to update the background model of the position where the pixel is located;

when the number of sample values in the background model of the first difference less than or equal to the first threshold is less than the second threshold, determining the pixel as a foreground pixel; and updating the first threshold at a predetermined period according to formula (1), where radius denotes the first threshold, and clarity denotes the clarity of the input images:

$$radius = \begin{cases} 5 & clarity < 10 \\ 3 * clarity - 25 & 10 \le clarity < 35 \\ 35 & clarity \ge 35 \end{cases} \quad (1)$$

8. The method according to claim 7, wherein the performing foreground detection on each pixel further comprises:

when the number of sample values in the background model of the first difference less than or equal to the first threshold is greater than or equal to the second threshold, calculating a second difference between the pixel value of the pixel and pixel values of neighboring pixels of the pixel, to determine a neighboring pixel of which the second difference is maximum; and calculating a third difference between the pixel value of the neighboring pixel of which the second difference is maximum and pixel values of sample values in the background model corresponding to a position where the neighboring pixel is located, and replacing a pixel value of a sample value in the background model of which the third difference is maximum with the pixel value of the neighboring pixel of which the second difference is maximum by a predetermined probability, to update the background model of the position where the neighboring pixel is located.

9. The method according to claim 7, wherein the performing foreground detection on each pixel further comprises:

obtaining pixel values of a first number of surrounding pixels of the pixel; and removing at least one surrounding pixel of which pixel value is maximum and at least one surrounding pixel of which pixel value is minimum to obtain pixel values of a second number of surrounding pixels, and determining the pixel values of the second number of surrounding pixels as being initial values of the sample values in the background model of the position where the pixel is located.

10. The method according to claim 7, wherein the input image comprises continuous a plurality of frames of input images, and the method further comprises:

performing ghost detection on each of foreground pixels that are determined as being foreground pixels in the input images; and wherein, the performing ghost detection on each of the foreground pixels comprises:

when the number of times that pixels at a position where the foreground pixel is located are continuously detected as foreground pixels in the continuous a plurality of frames of input images is greater than a third threshold, or when the number of times that a difference between a pixel value of the pixel at a position where the foreground pixel is located in the continuous a plurality of frames of input images and a pixel value of pixel at a corresponding position in a preceding frame of input image is less than a fourth threshold is greater than a fifth threshold, determining the foreground pixel as being a ghost pixel, or else determining the foreground pixel as being not a ghost pixel.

11. The method according to claim 10, wherein the method further comprises:

updating a background model of a position where the foreground pixel that is determined as being a ghost pixel is located.

12. A detection apparatus comprising:

a memory; and a processor coupled to the memory and configured to perform a process, including:

receiving an input image containing a plurality of pixels;

calculating, for each pixel, a first difference between a pixel value of the pixel and sample values in a background model corresponding to a position where the pixel is located;

when the number of sample values in the background model of the first difference is less than or equal to a first threshold which is greater than or equal to a second threshold, replacing a pixel value of a sample value in the background model of which the first difference is maximum with the pixel value of the pixel by a predetermined probability, to update the background model of the positon where the pixel is located;

when the number of sample values in the background model of the first difference is less than or equal to the first threshold which is less than the second threshold, determining the pixel as a foreground pixel; and updating the first threshold at a predetermined period according to formula (1), where radius denotes the first threshold, and clarity denotes the clarity of the input image:

$$radius = \begin{cases} 5 & clarity < 10 \\ 3 * clarity - 25 & 10 \le clarity < 35 \\ 35 & clarity \ge 35 \end{cases} \quad (1)$$

* * * * *